Jan. 12, 1960     F. M. RYCK     2,920,335
WINDSHIELD WIPER BLADE
Filed Nov. 23, 1956
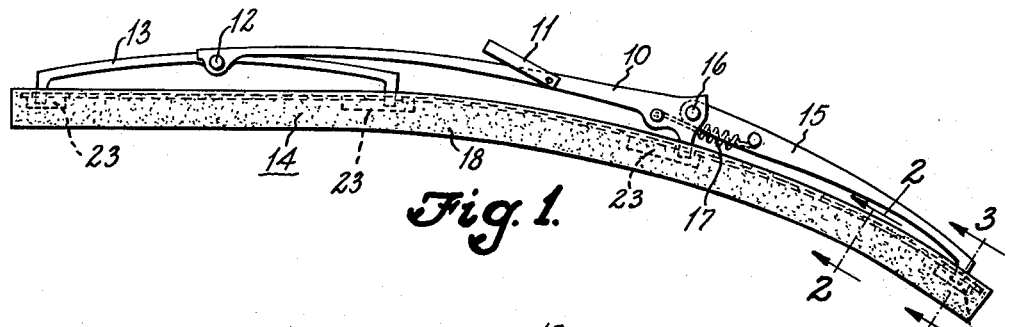
Fig. 1.
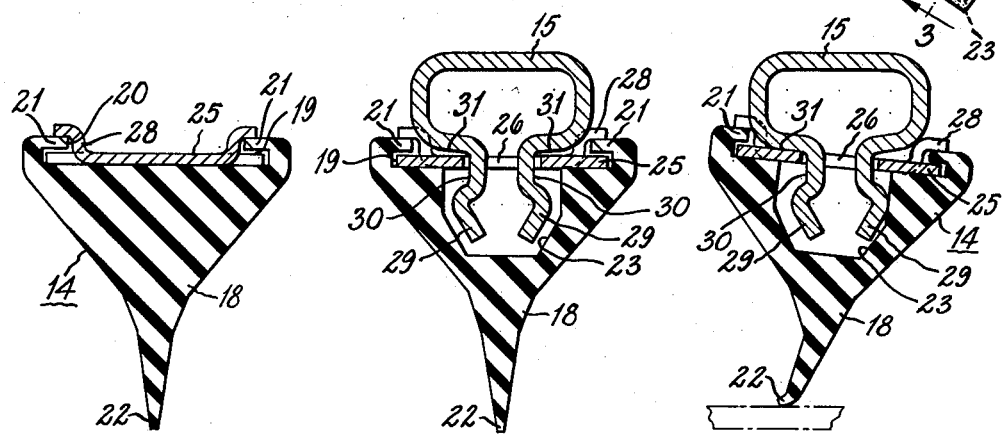
Fig. 2.     Fig. 3.     Fig. 4.
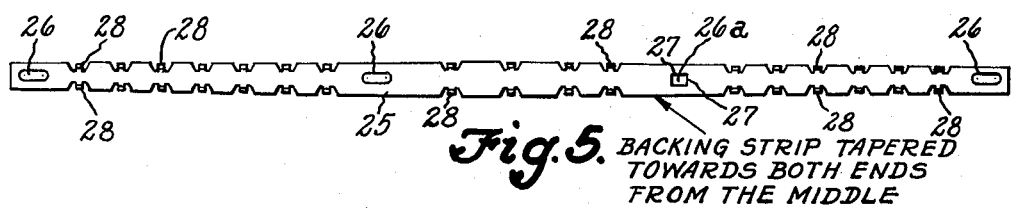
Fig. 5. BACKING STRIP TAPERED TOWARDS BOTH ENDS FROM THE MIDDLE
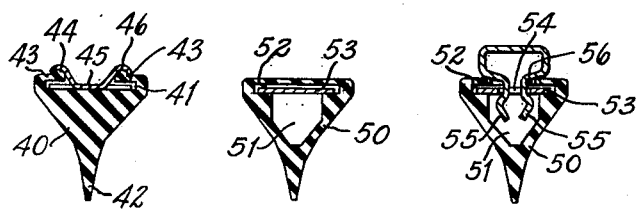
Fig. 6.     Fig. 7.     Fig. 8.
INVENTOR.
FRANCIS M. RYCK
BY
G. H. Strickland
ATTORNEY

United States Patent Office 2,920,335
Patented Jan. 12, 1960

2,920,335
WINDSHIELD WIPER BLADE

Francis M. Ryck, Rochester, N.Y., assignor to General Motors Corporation, Detroit, Mich., a corporation of Delaware Application November 23, 1956, Serial No. 624,095

12 Claims. (Cl. 15—245)

This invention pertains to windshield wipers, and particularly to a wiper blade for cleaning a curved surface embodying flexible backing means in combination with a pressure distributing superstructure including means for applying original deforming pressure to the outer end of the blade.

Heretofore, a wiper blade assembly including a non-uniformly resilient backing strip which is attached to a superstructure including a cantilever arm which is spring biased so as to normally deform the squeegee unit, has been manufactured, such a wiper blade being shown in copending application S.N. 496,132, filed March 23, 1955, in the name of Cyril T. Wallis. The present invention relates to an improved wiper blade of the general type shown in the aforementioned application including means for limiting tilting movement of the squeegee unit relative to the pressure distributing linkage, or superstructure. In addition, the wiper blade of the present invention will prevent contact between the metal parts of the superstructure and the flexible backing with the windshield so as to preclude the possibility of scratching the surface of the windshield. In addition, the wiper blade assembly of the present invention is less susceptible to malfunctioning due to the accumulation of ice or snow thereon. Accordingly, among my objects are the provision of a wiper blade assembly including a squeegee unit and a pressure distributing linkage having connections with the squeegee unit which permit tilting therebetween and limit the angle of tilt in both directions; a further provision of a wiper blade assembly including concealed connecting means between the pressure distributing linkage and the backing strip; the still further provision of a wiper blade including a squeegee which is readily adapted for molding; the further provision of a backing strip designed for attachment to a rubber wiping element in a unique manner; the still further provision of a wiper blade assembly wherein contact between the metal parts and the glass is prohibited by virtue of the blade construction; and the still further provision of a wiper blade constructed so as to be less susceptible to malfunction due to accumulation of ice or snow thereon.

The aforementioned and other objects are accomplished principally by encasing the flexible metal or other flexible material such as wood, plastic, etc., backing within the rubber wiping element and providing openings in the flexible backing for the reception of connecting means which are integral with the pressure distributing linkage. Specifically, in the preferred embodiment of the present invention, the rubber wiping element has molded therein a backing chamber along one edge. The rubber wiping element, or squeegee, is so molded that a pair of opposed anchoring ribs, or flaps, overhang portions of the backing chamber on opposite sides thereof. In accordance with conventional practice, the squeegee is also formed with a wiping edge, or lip. In addition, the squeegee is formed with a plurality of longitudinally spaced pockets, which communicate with the backing chamber, the pockets being designed to receive the connecting means of the pressure distributing linkage, or superstructure.

The backing chamber of the squeegee is designed to receive a non-uniformly resilient spring metal or other flexible material backing strip. The backing strip is non-uniformly resilient by reason of being tapered towards both ends from the middle thereof so that the outer end portions are more flexible than the medial portion thereof. In the preferred embodiment, the backing strip includes a plurality of longitudinally spaced slots through which the connecting means of the superstructure may extend. In addition, the backing strip is formed with a plurality of upstanding lugs which terminate in portions parallel to the backing strip proper so as to retain the flaps of the squeegee between the backing strip proper and the lugs thereof.

As alluded to hereinbefore, the superstructure is generally of the type shown in the aforementioned copending application, and thus comprises a primary yoke, or holder, a secondary yoke, the intermediate portion of which is pivotally connected to one end of the holder, and a cantilever arm, one end of which is pivotally connected to the other end of the holder. In addition, the cantilever arm and the holder are interconnected by a compression spring which normally pivots the cantilever arm relative to the holder so as to apply normal deforming pressure to the squeegee unit so as to form the squeegee unit into a curvilinear shape. One of the features of the present invention resides in the novel connecting means between the ends of the secondary yoke, one end of the holder, and one end of the cantilever arm with the backing strip. In the present invention, these ends of the pressure distributing linkage are formed with spring clips that are integral with the linkage members. These clips pass through the longitudinally spaced slots, or apertures, of the backing strip and enter the pockets in the wiping element so as to establish a supporting connection between the pressure distributing linkage and the squeegee linkage and the squeegee unit comprising the rubber wiping element and the backing strip. The arrangement of the parts is such that pressure applied by arm to the superstructure, is distributed through the backing strip by the connecting means, since the connecting means physically engage the backing strip. In addition, the spring clips limit lateral tilting movement of the squeegee unit relative to the superstructure so as to facilitate the proper lean, or drag, position of the wiper blade during wiping operation. It is specifically pointed out that in the wiper blade of this invention, the wiping element does not include a conventional reduced neck portion which usually permits tilting movement of the wiping lip to a drag position in conventional wiper blades.

In a modified embodiment, the rubber wiping element is molded with beads along the inner edges of the opposed flaps which overhang the backing chamber. These beads are received by suitable shaped lugs on the backing strip so as to securely retain the backing strip in assembly with the squeegee.

In a still further modification, the wiping element, or squeegee is formed with a hole therethrough, or in other words is formed as a hollow rubber element. Within the hollow rubber element is formed a backing chamber which receives a backing strip comprising a tapered spring metal, or other flexible material, member having a plurality of slots therein. In addition, the wiping member is formed with a plurality of slots for the reception of the spring clips which are formed integral with the ends of the pressure distributing linkage.

Further objects and advantages of the present invention will be apparent from the following description, reference being had to the accompanying drawing where-

3 in preferred embodiments of the present invention are clearly shown.

In the drawing:

Figure 1 is a side view, in elevation, of a wiper blade constructed according to the preferred embodiment of this invention.

Figure 2 is an enlarged sectional view taken along line 2—2 of Figure 1.

Figure 3 is an enlarged sectional view taken along line 3—3 of Figure 1.

Figure 4 is an enlarged sectional view similar to Figure 3 showing the drag position of the wiping element wherein the novel connecting means of the superstructure limits tilting movement of the squeegee unit relative to the pressure distributing linkage.

Figure 5 is a plan view of the backing strip embodied in the preferred embodiment.

Figure 6 is a sectional view of a modified embodiment.

Figure 7 is a sectional view of a further modified embodiment.

Figure 8 is a sectional view through the connecting means of the embodiment shown in Figure 7.

With particular reference to Figure 1, the wiper blade of this invention includes a pressure distributing linkage, or superstructure, constructed according to the aforementioned copending application. Thus, the superstructure includes a primary yoke, or holder, 10 having suitable arm attaching means 11. The inner end of the holder 10 is connected by pivot means 12 to the intermediate portion of a secondary yoke 13. Opposite ends of the secondary yoke are connected, by means to be described hereinafter, to a squeegee unit 14. A cantilever arm 15 is connected by means of pivot 16 to the other end of the holder 10. In addition, the other end of the holder 10 is connected to the squeegee unit 14. Moreover, the cantilever arm 15 and the outer end of the holder 10 are interconnected by a compression spring 17. The outer end of the cantilever arm 15 is also connected to the squeegee unit. The aforedescribed pressure distributing linkage, or superstructure, is of the type shown in the aforementioned copending application, and operates to distribute arm applied pressure to the squeegee unit, and in addition, the compression spring 17 normally pivots the cantilever arm 15 relative to the holder 10 so as to deform the squeegee unit to a curvilinear surface as shown in Figure 1.

With particular reference to Figures 1 through 4, the squeegee unit includes a rubber wiping element, or squeegee, 18. The squeegee 18 may be formed of rubber, either natural or synthetic, and is formed with a backing chamber 19 along one longitudinal edge thereof. To facilitate its molding, the squeegee 18 is molded with an open back as indicated by numeral 20 so as to provide opposed anchoring ribs, or flaps, 21. Each flap 21 overhangs the backing chamber 19 as shown in Figure 2. The squeegee body 18 is also formed with a laterally flexible wiping edge, or lip, 22. In addition, as shown in Figure 3, the squeegee 18 is formed with a plurality of longitudinally spaced pockets 23. In the embodiment disclosed, the squeegee 18 is formed with four longitudinally spaced pockets, two of which are adjacent the ends thereof, and two of which are disposed intermediate the ends. However, it is to be understood that this particular construction is only by way of example, and is not to be construed as a limitation, since it is obvious that if a different type of pressure distributing linkage, or superstructure, were employed having more than four points of connection with the squeegee unit, additional pockets would necessarily have to be embodied in the squeegee 18.

With particular reference to Figure 5, a backing strip 25 forms a component of the squeegee unit 14, and is arranged to be received within the backing chamber 19 of the wiping element 18. The backing 25 is preferably composed of spring metal, and is thus flexible in a plane

4 normal to the surface to be wiped, and by reason of its substantial width relative to its thickness, it is substantially inflexible in the plane parallel to the surface to be wiped. Moreover, the flexible backing 25 is non-uniformly flexible in a plane normal to the surface to be wiped by reason of being tapered towards both ends from the medial portion thereof, as clearly indicated in Figure 5. The backing strip 25 is formed with three longitudinally spaced slots, or apertures, 26 designed to receive the novel connecting means of the superstructure, to be described. A close examination of Figure 5 will indicate that the three slots 26 have curved ends, whereas a fourth slot, 26a is of rectangular configuration and has straight sides and ends indicated by numeral 27. The slot 26a having the rectangular configuration and including the straight ends 27 is designed to receive a clip from the superstructure which precludes longitudinal movement of the squeegee unit relative to the superstructure at this point of connection. In addition, the backing strip 25 is formed with a plurality of upstanding lugs 28 which are formed in pairs, or alternately, along opposite sides of the backing strip. As seen particularly in Figure 2, the upstanding lugs 28 have portions arranged in a plane spaced from but substantially parallel to the principal plane of the backing strip so as to retain therebetween the anchoring ribs, or lips 21 of the squeegee 18. Thus, when the backing strip is inserted into the wiping element 18 so as to form the squeegee unit 14, the anchoring lugs 28 embrace the flaps 21 so as to securely retain the backing strip connected with the rubber wiping element 18.

With particular reference to Figure 3, each end of the pressure distributing linkage which is designed to engage the backing strip, is formed with an integral spring type clip including hooked ends 29 which are suitably shaped to have a reduced portion 30, and are integral with the linkage members which are generally of channeled cross section. The reduced section 30 is received within the apertures, or slots 26 of the backing strip 25, and the hooked ends 29 of the spring clips are disposed within the pockets 23 of the rubber wiping element. In forming the spring clips on the ends of the press distributing members, surfaces 31 are formed on each of the spring clip members, which surfaces coact with the principal portion of the backing strip 25 as depicted in Figure 4 to limit tilting movement of the squeegee unit relative to the pressure distributing linkage, or superstructure. This arrangement facilitates the proper drag position of the squeegee unit relative to the glass during cleaning operation. Thus, as shown in Figure 4, the surface 31 of one of the spring clips is in engagement with the backing strip 25 so as to limit tilting movement of the squeegee unit 14.

In addition, as alluded to hereinbefore, the spring clip associated with the outer end of the holder 10 extends through the slot 26a having the straight end walls 27. This arrangement is provided so as to prevent longitudinal separation between the squeegee unit and the pressure distributing linkage. However, the spring clips on the ends of the secondary yoke 13 and on the free end of the cantilever arm 15 are movably connected with the backing strip by reason of the elongated slots 26 which receive their respective spring clips. This arrangement is necessary since during flexing movement of the wiper blade between substantially planer and curved surfaces, some degree of longitudinal relative movement between the superstructure and the squeegee unit is essential. The slot 26a can, of course, be of any shape which will limit the movement of its engaging spring clip.

With particular reference to Figure 6, a modified embodiment of the squeegee unit of the present invention will be described. In the modified embodiment, the rubber wiping element 40 is formed with a backing chamber 41 and a wiping edge 42. In this embodiment the wiping element 40 is formed with flaps 43 which overhang opposite side walls of the backing chamber 41. However, the flaps 43 are formed with beaded edges 44. Moreover, in the embodiment of Figure 6, the backing strip 45 is formed with upstanding lugs 46 adapted to fit the beads 44 on the lips 43. The rubber wiping element 40 of the embodiment shown in Figure 6 would likewise be formed with a plurality of spaced pockets, as indicated in the embodiment of Figures 1 through 5, for the reception of the novel spring connecting means of the pressure distributing linkage. In addition, the backing strip 45 is formed with longitudinally spaced slots, not shown, for the reception of the spring connecting means.

With particular reference to Figures 7 and 8, a still further embodiment of the present invention is disclosed in combination with a rubber wiping element 50 having a longitudinally extending opening 51 therethrough. The opening 51 communicates with a backing chamber 52 within which a tapered metal planar backing strip 53 is disposed. In the embodiment of Figures 7 and 8, the backing strip 53 is formed with a plurality of longitudinally spaced slots 54 for the reception of the spring clips 55 formed on the end of the pressure distributing members. Moreover, to accomplish this result, the rubber wiping element 50 is likewise formed with a plurality of slots 56 aligned with the slots in the flexible backing 53.

From the aforegoing it is manifest that the present invention provides a unique wiper blade assembly designed for wiping curved surfaces as well as substantially planar surfaces, wherein the connecting means between the squeegee unit and the superstructure are concealed within and by the rubber wiping element of the squeegee unit. This arrangement will reduce the tendency of malfunctioning due to the accumulation of ice and snow, and in addition will prevent contact between the metal parts of the superstructure and the glass surface to be wiped. In addition, the novel connecting means between the squeegee unit and the superstructure limit tilting movement of the squeegee unit in both directions during wiping operation. This is quite essential in wiping severely curved surfaces since this arrangement will limit the maximum permissible area of the rubber wiping element which contacts the glass which, if not limited, tends to overload the driving motor for the wiper blades. In addition the present invention provides unique connecting means between a backing strip and a rubber wiping element, or squeegee, which positively preclude contact between the metal backing member and the glass surface to be wiped.

While the embodiment of the present invention as herein disclosed constitute preferred forms, it is to be understood that other forms might be adopted.

What is claimed is as follows:

1. A windshield wiper comprising, an elongate blade body having a longitudinally extending wiping edge and an open backing chamber therefor, and a flexible backing arranged in the chamber for effecting conformance to a curved surface under the application of pressure, said blade body having a plurality of longitudinally spaced pockets therein communicating with said backing chamber, said flexible backing having a plurality of longitudinally spaced slots therein aligned with pockets in the blade body so as to receive connecting means from a pressure distributing linkage.

2. A windshield wiper comprising an elongate blade body having a longitudinally extending wiping edge and an open backing chamber therefor, and a flexible backing arranged in the chamber for effecting conformance to a curved surface under applied pressure, said blade body having a plurality of longitudinally spaced pockets communicating with said backing chamber, said backing having a plurality of longitudinally spaced slots aligned with said pockets for the reception of connecting means from a pressure distributing linkage, one of the slots in said backing being formed to receive a connecting means from the pressure distributing linkage so as to preclude relative longitudinal movement therebetween whereas the remaining slots in the pressure distributing linkage are elongated to facilitate relative longitudinal movement therebetween.

3. A subassembly for a flexible wiper blade including, an elongate flexible backing strip having a plurality of longitudinally spaced slots therein, and a pressure applying superstructure including a plurality of relatively movable members having spring clips at their free ends, said spring clips being arranged to be received in the longitudinally spaced slots of the backing strip so as to loosely interconnect the backing strip and the superstructure while limiting tilting movement therebetween in both directions.

4. A subassembly for a flexible wiper blade including a backing comprising an elongate flexible strip having a plurality of longitudinally spaced slots therein, one of said slots having longitudinal movement limiting end edges and the remaining slots being elongated, and a pressure applying superstructure comprising a plurality of relatively movable members having integral spring clips at their free ends arranged to be received within the slots of the backing strip, one of said spring clips being received in the slot having the movement limiting end edges so as to preclude relative longitudinal movement between the superstructure and the backing strip at one point while permitting relative longitudinal movement between the backing strip and the superstructure at the other points of connection.

5. A wiper blade assembly including, a squeegee unit flexible in a plane normal to the surface to be wiped and substantially inflexible in a plane at right angles thereto, and a pressure distributing superstructure including a plurality of relatively movable members having spring clips at the free ends of the members, said spring clips being adapted for connection with the squeegee unit so as to apply conforming pressure thereto at a plurality of longitudinally spaced points while limiting relative tilting movement between the squeegee unit and the superstructure.

6. A windshield wiper blade assembly including, a freely flexible elongate blade, a flexible backing strip arranged to support said blade, said backing strip having a plurality of longitudinally spaced slots therein, and a pressure applying superstructure comprising a plurality of relatively movable members having spring clips at their free ends, said spring clips being aligned with the spaced slots in the backing strip and extending therethrough so as to connect the backing strip with the superstructure, said spring clip connections limiting tilting movement of the flexible blade and the backing strip relative to the superstructure.

7. A windshield wiper comprising, a freely flexible blade body, a flexible backing arranged to support said blade body and having a plurality of longitudinally spaced slots therein, and a pressure applying superstructure comprising a plurality of relatively movable members having depending pairs of tangs at their free ends, said tangs being arranged to be extended through the slots in the backing strip, one of the slots in the backing strip closely confining one of said pair of tangs on one of said pressure distributing members so as to preclude relative longitudinal movement between the backing strip and the pressure distributing member at one point of connection therebetween whereas the remaining connections between the pressure distributing members and the backing strip permit relative longitudinal movement therebetween.

8. A windshield wiper blade assembly including, an elongate freely flexible blade body having a wiping edge and a backing chamber extending lengthwise thereof, a flexible backing arranged in the backing chamber having a plurality of longitudinally spaced slots, and a pressure applying superstructure comprising a plurality of relatively movable members having spring clips at their free ends, said blade body having a plurality of spaced pockets aligned with the slots in the backing strip, said spring clips on the free ends of the pressure distributing members being received by the slots in the backing and disposed within the pockets in the rubber body so as to interconnect the squeegee unit with the superstructure, said spring clip interconnections limiting relative tilting movement between the squeegee unit and the superstructure.

9. A windshield wiper blade assembly including, an elongate freely flexible rubber body having a wiping edge and a backing chamber, a flexible backing strip disposed in the backing chamber having a plurality of longitudinally spaced slots, said rubber body having a plurality of spaced openings communicating with slots in the backing strip, and a pressure applying superstructure including a plurality of relatively movable members having spring clips at their free ends, said spring clips being adapted for reception in the slots of the backing member through the openings in the rubber body, said spring clips cooperating with the backing strip to limit relative tilting movement between the blade body and backing strip and the superstructure.

10. A wiper blade assembly including, an elongate flexible blade having a wiping edge and a backing chamber extending lengthwise thereof, a flexible backing strip arranged in the backing chamber having a plurality of longitudinally spaced slots, said backing strip being of decreasing cross-sectional area towards both ends from the medial portion thereof so as to be nonuniformly flexible in a plane normal to the surface to be wiped, and a pressure applying superstructure comprising a plurality of relatively movable members having clips at their free ends, said clips being aligned with the spaced slots in the backing strip and extending therethrough so as to connect the backing strip with the superstructure.

11. A windshield wiper blade assembly including, an elongate flexible blade having a wiping edge and a backing chamber extending lengthwise thereof, pocket means in said blade communicating with said said backing chamber, a flexible backing strip arranged in said backing chamber and having a plurality of longitudinally spaced slots therein, and a pressure applying superstructure comprising a plurality of relatively movable members having clips at their free ends, said clips being aligned with the spaced slots in said backing strip and extending therethrough into said pocket means so as to connect the backing strip with the superstructure.

12. A subassembly for a flexible wiper blade including, an elongate flexible backing strip and a plurality of longitudinally spaced slots therein, said backing strip being of decreasing cross-sectional area towards both ends from the medial portion thereof so as to be nonuniformly flexible in a plane normal to the surface to be wiped, and a pressure applying superstructure including a plurality of relatively movable members having clips at their free ends, said clips being arranged to be received in the longitudinally spaced slots of the backing strip so as to loosely interconnect the backing strip and the superstructure while limiting tilting movement therebetween in both directions.

References Cited in the file of this patent

UNITED STATES PATENTS

| | | |
|---|---|---|
| 2,589,339 | Carson | Mar. 18, 1952 |
| 2,634,446 | Mackie et al. | Apr. 14, 1953 |
| 2,700,785 | Oishei et al. | Feb. 1, 1955 |
| 2,712,146 | Wise | July 5, 1955 |
| 2,728,100 | Oishei | Dec. 27, 1955 |
| 2,792,585 | Scinta | May 21, 1957 |

FOREIGN PATENTS

| | | |
|---|---|---|
| 619,320 | Great Britain | Mar. 8, 1949 |